Jan. 22, 1929.
A. J. KERCHER ET AL
1,699,738
ELECTRIC WATER HEATER
Filed May 17, 1926
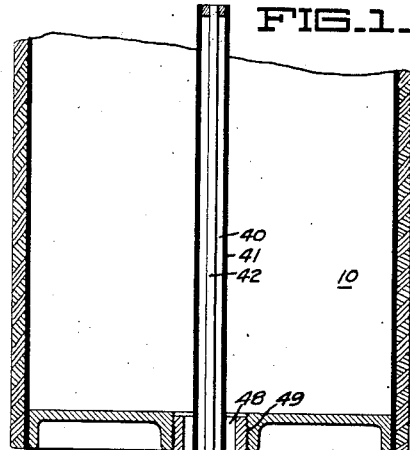
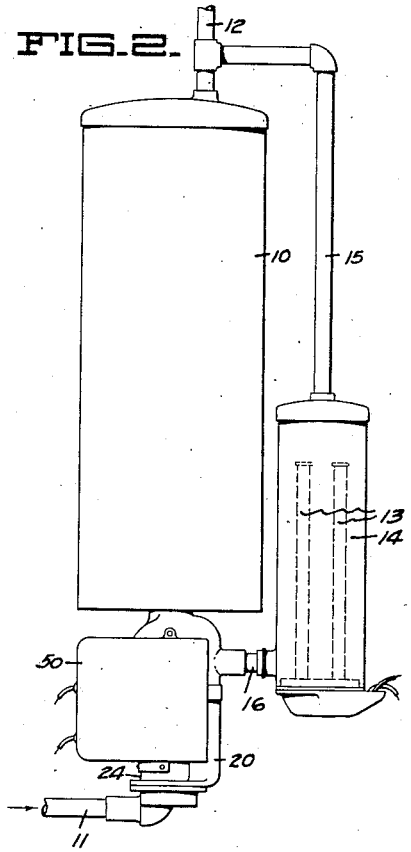
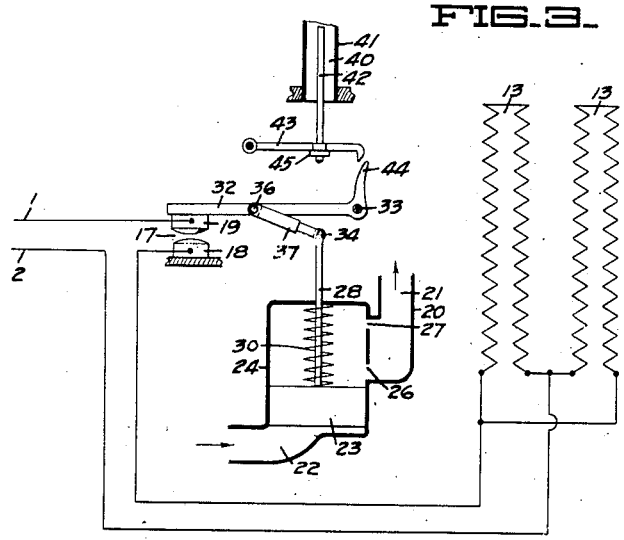
INVENTORS
Arthur J. Kercher
BY William Wesley Hicks
ATTORNEYS Patented Jan. 22, 1929.

1,699,738

UNITED STATES PATENT OFFICE.

ARTHUR J. KERCHER, OF BERKELEY, AND WILLIAM WESLEY HICKS, OF SAN FRANCISCO, CALIFORNIA.

ELECTRIC WATER HEATER.

Application filed May 17, 1926. Serial No. 109,472.

This invention relates generally to electric liquid heaters of the type employed in conjunction with household water supply systems.

Electric heaters for household water systems consist essentially of one or more electrical heating elements in close thermal contact with the liquid, generally a tank or reservoir being employed for storing a supply of heated liquid. The current consumption of the heating elements is usually relatively high so that an efficient form of current control is essential for economical operation. One form of control means employed has been an ordinary thermostat switch controlled by the temperature of the liquid being heated so that the heating element is energized upon cooling of the liquid and automatically disconnected when the temperature reaches a certain given maximum value. The chief difficulty with this system is that during periods when hot water is not required, the heater continues to function unless disconnected by a manually controlled switch with the result that considerable current is wasted.

It is an object of this invention to devise an electric liquid heater which will incorporate certain desirable features of a thermostat control but which will be economical in operation without manual attention.

It is a further object of this invention to devise an electric liquid heater which will incorporate a liquid actuated switch for closing the circuit to the heating element upon flow of liquid thru the system, in combination with a thermostat control for causing the switch to open when the liquid within a storage tank has been heated to a certain maximum temperature.

Further objects of this invention will appear from the following description in which we have set forth the preferred embodiment of our invention. It is to be understood that the scope of the invention is to be determined from the appended claims and the state of the prior art.

Referring to the drawings:

Figure 1 is a cross sectional elevational view showing the device of this invention applied to an ordinary electric liquid heater.

Fig. 2 is a side elevational view of the heater as shown in Fig. 1.

Fig. 3 is a circuit diagram illustrating the manner in which the current control means is connected to the electric heating element.

The device of this invention comprises generally an electric switch connected in series with the heating element of an electric heater, the switch being provided with separate means for actuating the same to closed and open positions respectively. For closing the switch, means is provided in the form of a plunger or piston which is actuated by flow of liquid thru the heater so that the heating elements are connected to the supply of current immediatealy upon opening a faucet connected with the heater. For causing the switch to be returned to open position there is provided a thermostat element which is responsive to the temperature of the liquid within the storage tank, the element being adapted to release the switch to cause the same to open the circuit.

Referring to the drawings, the device of this invention has been illustrated as being incorporated with a representative type of liquid heater comprising generally a storage tank 10 which is in communication with a supply of cold liquid thru the pipe 11, and with an outlet pipe 12 from which heated liquid may be withdrawn from the upper portion of the tank and which supplies faucets or other such devices. Associated with the tank 10 are one or more electrical heating elements 13 which are preferably positioned within a relatively small auxiliary reservoir 14. The upper and lower ends of the tank 10 and reservoir 14 are in communication respectively thru the pipes 15 and 16 whereby a thermal circulation may occur between the tank 10 and reservoir 14 to store heated liquid in the upper portion of the tank 10.

For controlling the current supplied to the heating elements 13 there is provided a switch 17 which is preferably connected in series with the current supply, the switch comprising insulated stationary and movable contacts 18 and 19. Between the inlet pipe 11 and the tank 10 means has been provided for closing the switch contacts 18 and 19 in response to flow of liquid thru the pipe 11. Thus there is provided a member 20 which is provided with a passageway 21 communicating with the lower portion of tank 10, and with another passageway 22 communicating with the intake pipe 11. Operatively disposed between the passageways 21 and 22 in such a position as to be actuated by flow of liquid thru the same is a plunger or piston 23 operating within a cylinder 24. For permitting flow of liquid into the passageway 21 the cylinder is provided with a suitable port 26 intermediate the ends of the cylinder 24. A second port 27 may also be provided near the upper end of the cylinder 24 for a purpose to be later described.

The piston 23 is preferably mounted upon one end of a rod 28 which slidably projects thru one end of the cylinder 24. Suitable means such as a packing gland 29 may be provided for preventing leakage around the rod 28. For resiliently urging the piston toward one end of the cylinder there is provided a compression spring 30 surrounding the rod 28 and which serves to press upon the upper face of the piston 23. The length of the cylinder 24 and the positioning of the ports 26 and 27 is such that the piston 23 normally takes a position in which it cuts off communication between the passageways 21 and 22; however, when a flow of liquid occurs thru the heater, as for example, by opening a faucet connected to the outlet pipe 12, the piston 23 will be forced upwardly against the pressure of the spring 30 to permit passage of cold liquid from the pipe 11 into the tank 10 thru passageway 21 and port 26. The purpose of the port 27 is to permit escape of liquid entrapped above the piston 23 so that the piston will be free to move upwardly in response to flow of liquid.

The rod 28 is connected with switch contacts 18 and 19 so that upon movement of the rod in response to flow of liquid the contacts will be moved to closed position. Thus the movable contact 19 has been shown as mounted upon one end of a lever 32, the other end of which is pivoted as at 33. Connected between the end 34 of the rod 28, and the intermediate point 36 on the lever 32, there is a resilient toggle connection 37 which is adapted to be compressed upon movement of the rod 28 with respect to the lever 32. When the end 34 of the rod 28 is below the centers of the pivot 33 and point 36 then the toggle connection 37 serves to bias the contact 19 in a direction to open the switch, but when the rod 28 is moved to a position in which the end 34 is above the centers of pivot 33 and point 36 then the toggle connection serves to bias the movable contact in a direction to close the switch. The latter position corresponds to the position of the piston 23 while water is flowing thru the system.

With the mechanism so far described it will be obvious that when water is caused to flow thru the system the piston 23 will be moved upwardly to cause the toggle connection 37 to force the contact 19 to closed position. As it is proposed to retain the contact closed until the water in tank 10 has become heated, means has been provided for retaining the switch in closed position after the return of the piston 23 to its normal position and to release the same only after the water in the tank 10 has been heated to a certain predetermined temperature. Thus in thermal contact with the heated liquid there is a thermostat element 40 preferably in the form of a tube 41 made of metal having a relatively high coefficient of expansion, the tube being shown as extending upwardly into the tank 10. The upper end of the tube 41 has been shown as connected to an inner rod 42 of suitable metal such as invar, having a relatively low coefficient of expansion. The other end of the rod 42 is adapted to extend outside the tank 10 and is connected to a suitable latch mechanism for releasably engaging the switch lever 32. The particular latch mechanism shown comprises a trigger lever 43 thru which the end of the rod 42 projects. The trigger 43 is adapted to engage a detent 44 mounted upon the switch lever 32 so that upon closing of the contacts 18 and 19 the detent 44 is adapted to be brought in position to be engaged by the trigger 43 to retain the switch in closed position. A nut 45 threaded upon the rod 42 serves to adjustably engage the trigger lever 43 so that the rod 42 may cause the release of the latch mechanism. Adjustment of the nut 45 determines the temperature to which the liquid must be heated before release of the switch.

In practice it is preferable to construct the device so that the member 20 serves as a mounting for the flow actuated mechanism, the switch 17, the thermostat element 40 and the latch mechanism so that it may be readily incorporated with a heater of standard construction. Thus the stationary contact 18 has been shown as mounted upon a bracket 47 fixed to the walls of the cylinder 24 while the switch lever 32 and trigger lever 43 have been shown as pivotally mounted directly upon the member 20. The passageway 21 is provided with an offset portion 48 in order to conveniently locate the tube 41 of the thermostat element 40. A threaded engagement 49 serves to connect the member 20 to the lower end of the tank 10, the pipe 16 which connects the lower portions of the tank 10 and reservoir 14 may communicate with the upper portion of the passageway 21. A protective casing 50 may be positioned over the exposed mechanism.

The operation of the device may be best understood by referring to the circuit diagram shown in Fig. 3. The heating elements 13 are connected to the current supply lines 1 and 2 in series with the switch 17. Assuming first a condition in which no flow of liquid is occurring thru the pipes 11 and 12, the spring 30 will force the piston 23 to take a position at one end of the cylinder 24 to interrupt communication between the passageway 22 and port 26. The toggle connection 37 then forces the switch lever 32 in a position to open the contacts 18 and 19. When a flow of liquid occurs as a result for example of the opening of a faucet connected to the outlet 12, the pressure above the piston 23 will immediately drop with the result that the differential pressure produced upon the piston will force it upward against the force of the spring 30 to expose the port 26 and permit liquid to flow thru passageways 22 and 21. At the same time however, the toggle connection 37 will be moved in a position in which it will force the movable contact 19 down in electrical contact with contact 18 to close the switch. Trigger 43 will then engage the detent 44 to retain the switch in such position even after flow of liquid has been arrested. The heating elements now being energized the water within the tank 10 will be heated until the thermostat 40 reaches a sufficient temperature to lift the trigger 43 out of engagement with the detent 44, after which the contacts will be moved to open position to interrupt the circuit. Therefore during a long period when the device is not in use the liquid within the tank 10 will not be continuously maintained at a certain temperature. However, after the closing of the switch 17 has been initiated by flow of liquid thru the system, then the thermostat control will come into operation to cause the switch to open only after a given supply of hot liquid has been stored in the tank 10.

It will be obvious that this heater will be economical in current consumption without the necessity of manual attention. As long as the faucets are frequently opened a supply of hot water will always be maintained. For periods of from say 8 to 12 hours, such as during the night, the supply of hot liquid stored from the last heating operation will not have had time to cool so that unless the system remains idle for a day or more, there will always be sufficient to meet the usual household demands.

We claim:

1. An electric liquid heater comprising electrical heating means associated with a liquid supply system, a switch for controlling the supplying of current to said heating means, means actuated by a flow of liquid thru said system to close said switch, and thermostatic means for effecting opening of said switch responsive to the temperature of liquid within the system when said first named means is inactive to close said switch.

2. An electric heater associated with a liquid supply system comprising a tank which is adapted to store heated liquid, electrical heating means for heating liquid within said tank, a switch for controlling the supplying of current to said heating means, said switch being normally biased to an open position, means actuated by flow of water thru the system for closing said switch, means for retaining said switch in closed position, and thermostatic means associated with the liquid in the system for releasing said switch when said means actuated by flow of water is inactive to close said switch.

3. An electric heater associated with a liquid supply system comprising a tank which is adapted to store heated liquid, an electrical element for heating liquid within the tank, a switch for controlling current supplied to said heating element, said switch being normally biased to an open position, means actuated by flow of water thru the system for closing said switch, latch means for retaining said switch in closed position, and thermostatic means associated with the liquid in the system for releasing said latch means when said means actuated by flow of water is not effective to retain said switch in closed position.

4. An electric liquid heater comprising a tank which is adapted to store heated liquid, a pipe adjacent the lower end of said tank for supplying cold liquid under pressure, electrical means for heating the liquid in said tank, a switch for controlling the supplying of current to said heating means, means associated with said pipe for closing said switch responsive to a flow of liquid thru the pipe, and thermostatic means responsive to the temperature of liquid within the tank for effecting opening of said switch when said means associated with said pipe is ineffective to retain said switch in closed condition.

5. An electric liquid heater comprising a tank which is adapted to store heated liquid, a pipe communicating with said tank for supplying cold liquid under pressure, electrical means for storing heated liquid in the tank, a switch for controlling the supplying of current to said heating means, means including a plunger actuated by flow of water thru said pipe for closing said switch, and thermostatic means responsive to the temperature of liquid within the tank for effecting opening of the switch when said last mentioned means is ineffective to retain said switch in closed condition.

6. An electric liquid heater comprising electrical heating means associated with a liquid supply system, a switch for controlling the supplying of current to said heating means, means actuated by a flow of liquid thru said system to close said switch, means tending to open said switch when no liquid is flowing thru the system, latch means for retaining the switch in closed position, and thermostatic means for releasing said latch means, whereby the switch will return to open position only when there is no flow of liquid thru the system.

7. An electric liquid heater comprising electrical heating means associated with a source of current, switch means for controlling said current, said switch means including a movable contact, a member adapted to be actuated by flow of liquid thru the heater, resilient means connecting said member and movable contact for biasing said contact toward open position while no flow of liquid is occurring but toward closed position when a flow does occur, and means including a temperature responsive element for controlling returning of the movable contact to closed position.

8. An electric liquid heater comprising electrical heating means associated with a source of current, switch means for controlling said current, said switch means including a pair of relatively movable contacts, pressure operated means responsive to flow of liquid thru the heater for biasing said contacts toward closed position, and temperature responsive means for locking said contacts in closed position when the temperature of the liquid being heated is below a given value, said temperature responsive means being adapted to release said contacts when the liquid has been heated above a given temperature.

In testimony whereof we have hereunto set our hands.

ARTHUR J. KERCHER.
WILLIAM WESLEY HICKS.